United States Patent [19]

Schaper

[11] 4,439,580

[45] Mar. 27, 1984

[54] CATIONIC WATER-IN-OIL POLYMER EMULSIONS

[75] Inventor: Raymond J. Schaper, Pittsburgh, Pa.

[73] Assignee: Calgon Corporation, Pittsburgh, Pa.

[21] Appl. No.: 412,338

[22] Filed: Aug. 27, 1982

[51] Int. Cl.³ ............................................. C08F 2/28
[52] U.S. Cl. ..................................... 524/801; 523/337
[58] Field of Search ......................... 524/801; 523/337

[56] References Cited

U.S. PATENT DOCUMENTS

| | | | |
|---|---|---|---|
| 3,284,393 | 11/1966 | Vanderloff et al. | 260/29.6 |
| 3,288,770 | 11/1966 | Butler | 260/88.3 |
| 3,920,599 | 11/1975 | Hurlock et al. | 260/29.64 |
| 3,968,037 | 7/1976 | Morgan et al. | 210/47 |
| 4,217,262 | 8/1980 | Coscia | 524/801 |
| 4,242,247 | 12/1980 | Pellon | 524/801 |
| 4,379,883 | 4/1983 | Zecher | 524/801 |

FOREIGN PATENT DOCUMENTS 141028  4/1980  German Democratic Rep. .

OTHER PUBLICATIONS

Jaeger, W. et al, "Synthesis and Polycation–Polyanion–Interaction of Poly (Dimethyl Diallyl Ammonium Chloride)", *Polymeric Amines and Ammonium Salts*, 1980.

*Primary Examiner*—Paul R. Michl
*Attorney, Agent, or Firm*—R. Brent Olson; William C. Mitchell

[57] ABSTRACT

The instant invention is directed to a process for the production of high molecular weight water-in-oil polymer emulsions of cationic polymers.

8 Claims, No Drawings

CATIONIC WATER-IN-OIL POLYMER EMULSIONS

BACKGROUND OF THE INVENTION

Polymers of cationic monomer, such as dimethyldiallyl ammonium chloride, have been prepared via solution polymerization techniques (U.S. Pat. No. 3,288,770). The intrinsic viscosity of the polymeric products of the process is indicative of the molecular weight of the polymer. Values of 0.5 to 2.0 dl/g in 0.1 N potassium chloride were indicated. The intrinsic viscosities would be considerably lower in 1.0 M NaCl.

U.S. Pat. No. 3,284,393 discloses that water-in-oil emulsion polymerization techniques are useful for polymerization of water-soluble monomers.

U.S. Pat. No. 3,968,037 discloses that the water-in-oil emulsion polymerization of cationic monomer containing crosslinking agents results in water-soluble polymer useful as flocculants and for the treatment of activated sewage sludge.

East German Pat. No. 141,028 discloses the control of pH to allow for the low temperature solution polymerization of diallyldialkyl ammonium chloride.

Jaeger, W., et al, "Synthesis and Polycation-Polyanion-Interaction of Poly(Dimethyl Diallyl Ammonium Chloride)", *Polymeric Amines and Ammonium Salts,* edited by E. J. Goethals, Pergamon Press, New York, 1980, discloses the effect of salts on the rate of solution polymerization of dimethyldiallyl ammonium chloride.

U.S. Pat. No. 3,920,599 discloses that homopolymers of diallyldimethyl ammonium chloride as well as copolymers with acrylamide can be prepared in water-in-oil emulsion polymerization, requiring considerable time at high temperatures to form stable polymeric latices. The intrinsic viscosities of these polymers is in the area of 0.7 dl/g.

It was surprisingly found that the pH range and salt content parameters of the instant invention resulted in a different polymer, prepared via the water-in-oil emulsion polymerization technique than produced at a lower pH and/or in the absence of salt.

It was further found that the products of the process of the instant invention were stable for at least three weeks and were capable of being inverted rapidly in water to form a solution.

Finally, the polymer concentration, with respect to the emulsion, varies between 20 to 75 percent by weight, containing a polymer with an intrinsic viscosity above 1.5 dl/g, when measured in 1.0 M NaCl.

DESCRIPTION OF THE INVENTION

The instant invention is directed to a process for the production of high molecular weight water-in-oil polymer emulsions comprising:

(a) preparing a 35 to 75, preferably 45 to 60, percent, by weight, aqueous solution of at least one cationic monomer, and optionally, at least one non-cationic, water-soluble olefinic monomer, containing 0.5 percent to saturation, of added salt;

(b) preparing a water-in-oil emulsion of the aqueous solution of (a) in a water-insoluble liquid containing a surfactant, said monomer concentration of the total emulsion being about 20 to 75, preferably 30 to 40, percent, by weight; and (c) polymerizing said monomer emulsion at a pH of 7 to 13 in the presence of a polymerization catalyst to produce an emulsion containing a polymer with an intrinsic viscosity in 1.0 M NaCl of above 1.5 dl/g.

Any cationic monomer may be used. The preferred cationic monomers may be represented by the formula:

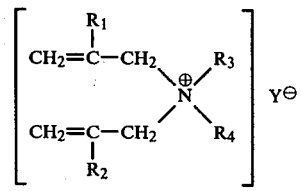

where
$R_1$ and $R_2$ are hydrogen or a methyl or ethyl group;
$R_3$ and $R_4$ is an alkyl, hydroxyalkyl carboxy alkyl, carboxyamide alkyl, or alkoxyalkyl group having from 1 to 18 carbon atoms; and
$Y^-$ represents an anion.

Illustrative examples of raadicals represented by $R_3$ and $R_4$ are methyl to octadecyl, inclusive; hydroxymethyl and the various hydroxyethyl to hydroxyoctadecyl, inclusive; and methyoxymethyl and the various higher alkoxy (e.g., methoxy to octadecoxy, inclusive) alkyls, e.g., ethyl to octadecyl, inclusive. Illustrative examples of anions represented by Y are the halide ions (that is, Y can represent halogen; more particularly, chlorine, bromine, fluorine or iodine), sulfate, sulfonate, phosphonate, hydroxide, borate, cyanide, carbonate, thiocyanate, thiosulfate, isocyanate, sulfite, bisulfite, nitrate, oxalate, silicate, sulfide, cyanate, acetate and the other common inorganic and organic ions.

Specific examples of the cationic monomers include the diallyldimethyl, dimethallyl dimethyl and diethallyl dimethyl, diallyl di-(beta-hydroxyethyl) and diallyl di-(beta-ethoxyethyl) ammonium chlorides, bromides, phosphates and sulfates.

Homopolymers and copolymers may be prepared from the above cationic monomers, alone, or in combination with non-cationic, water-soluble olefinic monomers.

Copolymers of the cationic monomer and non-cationic, water-soluble olefinic monomers may be used. Examples of non-cationic water-soluble olefinic monomers which may be used, alone or in admixture with one another, include the acrylamides such as acrylamide, methacrylamide, N-N-dimethyl acrylamide the dialkylaminoalkyl acrylamides, such as dimethylaminoethyl acrylamide and methacrylamide, the acrylic acids such as acrylic acid and methacrylic acid, various dialkylaminoalkyl acrylates, such as dimethylaminoethyl acrylate, dimethylaminoethyl methacrylate, vinyl pyridine, methyl vinyl pyridine, vinyl pyrrolidone, various amino styrenes such as p-dimethylaminomethyl styrene, compounds such as vinyl sulfonic acid and the like.

Although any ratios of cationic monomers and non-cationic olefinic monomers may be used, it is preferred to use 50 to 100 percent, by weight, cationic monomers and 0 to 50 percent, by weight, of non-cationic, water-soluble olefinic monomers.

The oil phase may be any inert water-insoluble liquid. A preferred group of organic liquids are the hydrocarbon liquids, which include both aromatic and aliphatic compounds. Thus, such organic hydrocarbon liquid as benzene, xylene, toluene, mineral oils, mineral spirits, kerosene, naphthas, and in certain instances, petrolatums may be used. Preferred oils include Mentor 28, marketed by Exxon, Soltrol 200 and Soltrol 220, marketed by Phillips Petroleum Company and Kensol 61, marketed by Kendall Refining Company.

tained at that temperature for seven hours. The emulsions were inverted with nonylphenoxypoly (ethyleneoxy) ethanol (Igepal CO-610 manufactured by GAF Corporation).

TABLE I

| Example | Percent Solids | Percent Aqueous Monomer Concentration | Percent Salt/ Monomer Phase | Percent APS/ Monomer | pH | Temperature Profile (°C.) Min | Max | Percent Conversion | [η] dl/g |
|---|---|---|---|---|---|---|---|---|---|
| 1 | 35.00 | 55.00 | 5.08 | 1.51 | 9.9 | 25 | 32 | 94 | 1.7 |
| 2 | 35.00 | 52.00 | 4.14 | 1.00 | 10.3 | 28 | 41 | 96 | 1.97 |
| 3 | 35.00 | 52.00 | 4.14 | 0.50 | 10.7 | 28 | 41 | 96 | 2.18 |
| 4 | 35.00 | 52.00 | 4.14 | 0.25 | 10.9 | 21 | 41 | 78 | 2.40 |
| 5 | 35.00 | 52.00 | 4.14 | 0.125 | 10.8 | 22 | 41 | 44 | 2.50 |

The surfactant may be selected from low HLB materials, as summarized in *McCutcheon's Detergents and Emulsifiers*, 1978 Edition, MC Publishing Co., pages 17 through 23. In addition, mixtures of very low HLB surfactants (0 to 4) can be admixed with higher HLB components to arrive at a suitable HLB "composition" surfactant system.

A polymerization catalyst is generally present. Examples include: free radical initiators, such as organic peroxy initiators, i.e. t-butyl peroxy pivalate; redox systems, i.e. t-butyl peroxy pivalate/Fe (II), ammonium persulfate/bisulfite; and azo initiators, i.e. 4,4'-azobis-4-cyano pentoic acid and 2,2'-azobis(isobutyronitrile). It is preferred to use ammonium persulfate with this emulsion system.

The critical elements of the instant invention are the narrow pH range and added salt, which allow one to conduct the polymerization at a rather low initiation temperature.

A pH of 7 to 13, preferably 8.0 to 10.5, is required. The addition of 0.5 percent to saturation, preferably 3 to 15 percent, by weight, of salt is required. The pH range is adjusted, preferably by the addition of buffered substances. Any salts and buffers may be used. Examples include: alkali metal and ammonium acetates, carbonates, bisulfates and borates; chlorides and sulfates of copper and iron; phthalates, citrates, borates, phosphates, acetates, ammonium hydroxide, ammonium acetate, and ammonium chloride; and mixtures of boric acid and borax, citric acid and sodium acid phosphate, sodium carbonate and sodium bicarbonate, ammonium chloride and ammonium hydroxide and ammonium acetate and ammonium hydroxide. Mixtures of the salts and buffers may be used. It is preferred to use sodium chloride as the salt and ammonium hydroxide as the buffer.

EXAMPLES

The aqueous phase was prepared from a dimethyldiallyl ammonium chloride, salt, water, ammonium persulfate, and ammonium hydroxide in the amounts indicated in Table I. The oil phase was prepared from 28.13 parts of a 25 percent dialkylphenoxypoly (ethyleneoxy) ethanol (Igepal DM-430 manufactured by GAF Corporation)/75 percent modified alkanolamide (Witcamide 511 manufactured by Witco Chemical Corporation) mixture and 359.50 parts of a high boiling paraffinic mineral oil (Kensol 61 manufactured by Kendall Refining Company, a division of Witco Chemical Corporation). The aqueous phase was added to the oil phase and stirred. The emulsion was then purged and allowed to rise to the temperature indicated in Table I and main-

What is claimed is:
1. A process for the production of high molecular weight water-in-oil polymer emulsions, comprising the steps of:
   (a) preparing a 35 to 75 percent by weight, aqueous solution of at least one cationic monomer containing 0.5 percent, by weight, to saturation, of added salt;
   (b) preparing a water-in-oil emulsion of the aqueous solution of (a) in a water-insoluble liquid containing a surfactant, said monomer concentration of the total emulsion being about 20 to 75 percent, by weight; and
   (c) polymerizing said monomer emulsion at a pH of 7 to 13 in the presence of a polymerization catalyst to produce an emulsion containing a polymer with an intrinsic viscosity in 1.0 M NaCl of above 1.5 dl/g.
2. The process of claim 1, wherein said cationic monomer is represented by the formula:

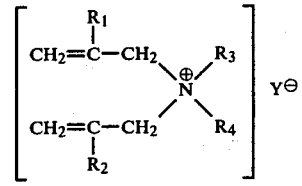

where
R₁ and R₂ are hydrogen or a methyl or ethyl group;
R₃ and R₄ is an alkyl, hydroxyalkyl carboxy alkyl, carboxyamide alkyl, or alkoxyalkyl group having from 1 to 18 carbon atoms; and
Y⁻ represents an anion.
3. The process of claim 1, wherein, in step (a), a 45 to 60 percent, by weight, aqueous solution of cationic monomer is prepared.
4. The process of claim 1, wherein said monomer concentration of step (a) is about 30 to 40 percent, by weight, of the total emulsion.
5. The process of claim 1, wherein said step (c) is conducted at a pH of 8.0 to 10.5.
6. The process of claim 1, wherein, in step (a), 3 to 15 percent, by weight, of salt is added.
7. The process of claim 1, wherein said cationic monomer is dimethyldiallyl ammonium chloride.
8. The process of claim 1, wherein said aqueous solution of cationic monomer further comprises at least one non-cationic, water-soluble olefinic monomer.

* * * * *